March 24, 1959 T. HOFMAN ET AL 2,878,567
APPARATUS FOR CUTTING SPECTACLE-GLASSES
Filed Aug. 1, 1955 2 Sheets-Sheet 1

INVENTORS
TJAART HOFMAN
CORNELIS WRISTER HOFMAN

BY
ATTORNEYS

March 24, 1959  T. HOFMAN ET AL  2,878,567
APPARATUS FOR CUTTING SPECTACLE-GLASSES
Filed Aug. 1, 1955  2 Sheets-Sheet 2

INVENTORS
TJAART HOFMAN
CORNELIS WRISTER HOFMAN
BY
ATTORNEYS

United States Patent Office 2,878,567
Patented Mar. 24, 1959

2,878,567

APPARATUS FOR CUTTING SPECTACLE-GLASSES

Tjaart Hofman and Cornelis Writser Hofman, Roden, Netherlands

Application August 1, 1955, Serial No. 525,722

Claims priority, application Netherlands July 31, 1954

8 Claims. (Cl. 33—28)

This invention relates to an apparatus for cutting spectacle lenses for spectacles having frames, and more especially to a device that uses the spectacle frame rim itself as a template to assure a perfect fit of the lens in the frame.

In the know devices of this general description the lens is not cut directly but is reversed with respect to the frame opening. The known devices are at best adapted for cutting lenses for new spectacles where the reversal is of no importance, but for old spectacle frames where the lenses have been changed several times the known devices are not sufficiently accurate.

It is an object of the present invention to overcome the deficiencies of the known devices and provide a simple, light apparatus that at the same time enables the operator to accurately position the frame and the lens relative to each other, and also to cut the lens to an accurate shape to fit the frame.

Figures 1, 2, 3, 5:
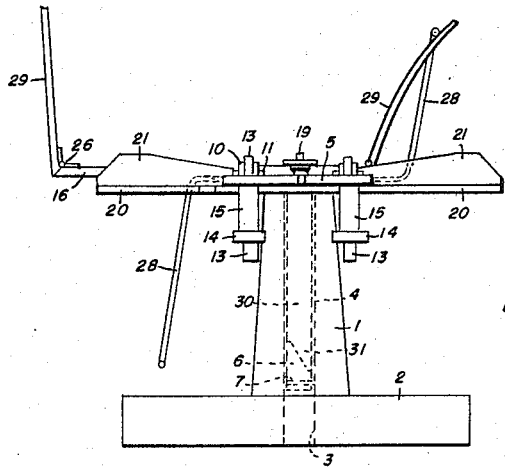
Figure 10:
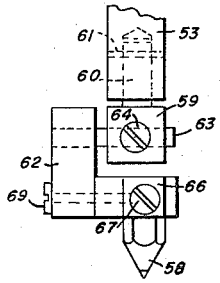
Figure 4:
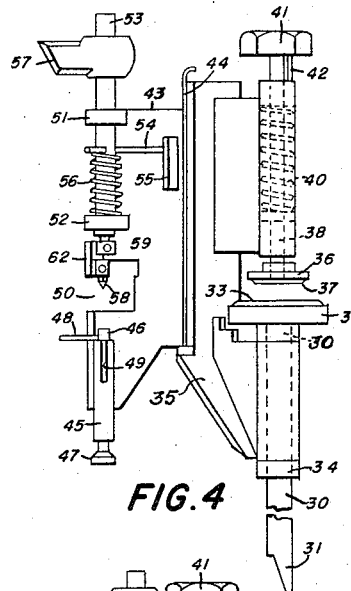
Figure 6:
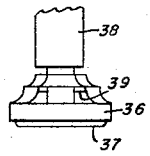
Figure 7:
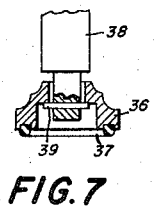
Figure 11:
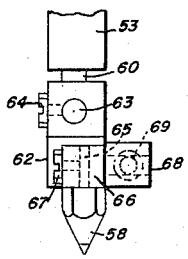
Figure 12:
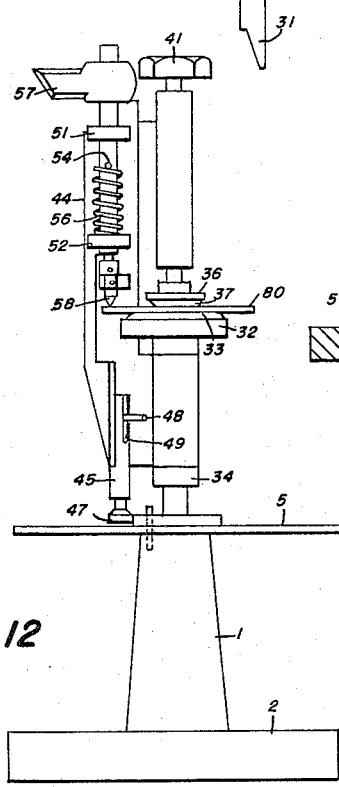
Figure 8:
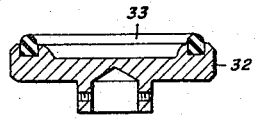
Figure 9:
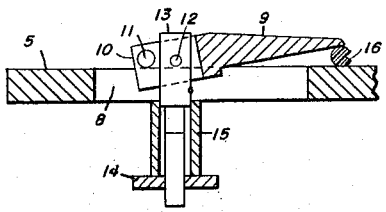

Other and further objects and advantages will appear from the following specification taken with the attached drawings in which like characters of reference designate similar parts in the several views, and in which:

Fig. 1 is an elevation of the base with the frame table mounted thereon and a spectacle frame secured to the table, Fig. 2 is a plan view of the device of Fig. 1, Fig. 3 is an elevation at right angles to the view of Fig. 1, Fig. 4 is an elevation of the spindle lens table cutter and follower assemblage, Fig. 5 is a plan view showing the assemblage of Fig. 4 mounted on the Fig. 2 base, Fig. 6 is an enlarged elevation of the lens blank pressure member, Fig. 7 is similar to Fig. 6 but in partial section, Fig. 8 is a section of the lens blank supporting table, Fig. 9 is an enlarged fragmentary sectional view taken on line 9—9 of Fig. 2, Fig. 10 is an enlarged elevation of the cutter spindle, Fig. 11 is a view similar to Fig. 10 but at right angles thereto, and Fig. 12 is an elevation of the entire device in operation using a template for guiding the cutter.

In the drawings, a column 1 is securely supported by a base 2. A socket is provided in the form of a vertical bore 3 in column 1. A hollow spindle 4 is secured to the bottom of frame table 5, which carries a coupling 6 at its bottom and is dimensioned to fit into socket 3. The coupling 6 may be a plug with an upper face at an angle to the axis of hollow spindle 4 and may be secured in the spindle by a pin 7.

The frame table 5 is shown as being rectangular. Slots 8 in which clamps 9 are positioned are shown as directed at oblique angles to the edges of the plate and extending generally in the direction of the hollow of spindle 4.

The clamps consist of a clamp arm 9 which is forked at 10 at the end remote from spindle 4. A transverse pin 11 bears on the top of table 5. A pull rod 13 is pivoted to clamp arm 9 by a pin 12. Rod 13 extending downwardly through slot 8 is threaded at its lower end and carries a nut 14 spaced from table 5 by a spacer sleeve 15, so that the nut 14 may be operated manually to pull clamp arm 9 downwardly into clamping position over a spectacle frame 16 mounted, as seen in Fig. 2, with the lens rim surrounding spindle 4.

Frame table 5 is also provided with a slot 17. A plate 20 is secured below table 5 by a bolt 19 extending upwardly through slot 17, and is guided to always move parallel to itself by bolt 19 and a lug 18 that extends up into slot 17 from plate 20. Vertically extending stop surfaces or walls 21 mounted on plate 20 extend partly over, and partly beyond, table 5 and form a datum for the location of the spectacle frame against which the upper edge of a spectacle frame can be placed to adjust the frame on the table for vertical location of the center of the spindle with respect to the frame.

Table 5 is also shown as being provided with recesses 23 and 24 at its edges near the location of stop surfaces 21. These recesses provide for the projection of the bridge 25 or of the hinges 26 of a spectacle frame so that these parts will not prevent the rim portion of the frame from lying flat on table 5.

The edges of table 5 are provided with holes into which arms 28 may be inserted. These arms 28 serve to hold temple 29 of the spectacle frame out of the way during use of the device.

By the structures described above a spectacle frame may be located and clamped on table 5 with rim 16 located with respect to the center of spindle 4 so that the inner surface of rim 16 may be used as a template for cutting a lens that is to fit that specific rim.

The cutting device itself, which is assembled with the above described frame table assemblage, is seen in Fig. 4. A shaft or spindle 30 having one end 31 formed in a shape complementary to coupling 6, fits into hollow spindle 4 and is held in vertical position to extend upwardly and non-rotatably over table 5.

At the upper end of spindle 30 is a lens blank table 32 which is shown also in section in Fig. 8. Table 32 is fitted with a rubber ring 33 which is the portion of the lens table that contacts the lens.

A fixed ring 34 supports a rotatable frame 35 on spindle 30. Frame 35 extends upwardly around lens table 32 and is provided with a clamp member 36 carrying a rubber ring 37. Rod 38 that carries clamp member 36 is concentric with lens table ring 37 and is spring pressed downwardly by spring 40, when in use, to securely clamp a lens against lens table 32. Clamp member 36 is loosely secured to the lower end of rod 38, as seen in Figs. 6 and 7. Rod 38 may be held in lifted position with respect to the lens table 32 when not in use by means of a knob 41 that has a pin 42 in its lower side that will extend into a hole in the frame in a specific position of knob 41 to permit the shaft 38 to move downwardly or will contact the surface of frame 35 to prevent such downward motion.

Frame 35 carries a swingable frame element 43 hinged to it at 44. Frame 43 carries a sleeve 45 at the lower end in which a pin 46 is journaled. A feeler or follower roller 47 is carried by pin 46 at its lower end. Pin 46 carries a pin 48 at right angles that may be used to hold follower 47 in raised position when pin 48 is in contact with the top of sleeve 45, or the follower 47 may be lowered when pin 48 enters slot 49.

Frame element 43 is notched at 50 so that the sleeve 45 carrying follower 47 may swing under the lens table 32 without disturbing a lens mounted on the lens table and extending therebeyond.

The upper part of frame element 43 carries a vertically movable pin 53 guided for accurate vertical movement by eyes 51 and 52. Rotation of pin 53 is prevented by bar 54 that slidably engages and is guided by a rib 55. Compression spring 56, operating against eye 52 and against bar 54, normally holds pin 53 in elevated position. Handle or key means 57 is set at an angle so that, in pushing against the face of the handle, the shaft 53 is moved downwardly and the frame 35, 43 is rotated on spindle 30. The handle will, however, only be put in operation when follower 47 is in contact with a rim 16 of a spectacle frame, or with a template.

A cutter 58, shown in detail in Figs. 10 and 11, is secured to the bottom of pin 53 by means of a block 59 mounted on a pin 60 non-rotatably secured to pin 53 by means of pin or key 61. An adjusting block 62 on which is provided with a pin 63 which extends through block 59 and is fixed securely to block 59 by a set screw 64. Cutter 58 is mounted in block 66 by means of a pin 65 and a set screw 67. Block 66 is mounted on block 62 by means of pin 68 which is held, when adjusted, by set screw 69.

It will be seen, then, that the cutter can be adjusted over a wide range of positions so that when using the frame rim as a template the lens blank is cut to have the size and shape required to exactly fit the frame rim. It will be noted that the exact position of the cutter with respect to the feeler is dependent on the depth of the groove on the inside of the rim 16 of the spectacle frame (see Fig. 9).

Fig. 12 shows the device complete. A lens blank 80 is clamped between lens table 32 and clamp member 36. As shown here, an outside template is in use which may be used for new frames of standard shape. This template has a hole therethrough by which it is centered on spindle 30, and may be held against rotation by any known means such as a pin extending into the table 5.

If pin 53 is depressed and cutter 58 contacts the upper surface of lens blank 80 and follower 47 presses against the template, then as frame 35, 43 is rotated on spindle 30 the lens blank is cut all the way around by cutter 58.

What is claimed is:

1. An apparatus for cutting spectacle lenses to fit a frame, comprising a base, a frame-table mounted on said base, a socket through said frame table extending into said base, a spindle mounted in said socket, coupling means in said socket and on said spindle to prevent rotation of said spindle in said socket, a lens blank table fixed to the upper end of said spindle, a frame rotatably mounted on said spindle and extending radially outwardly beyond the edge of said lens blank table, a clamp means mounted on said frame over said lens blank table to clamp a lens thereon, a frame part hinged to said frame on a pivot parallel to said spindle, a follower mounted for vertical adjustment at the lower end of said frame part, said frame part having a notch therein opposite said lens blank table so that said frame part will not contact said lens blank table or said clamp means when swung toward the axis of said spindle, a vertically movable pin, and a cutter mounted on said vertically movable pin above said notch and generally in alignment with said follower, the mounting of said cutter on said pin being such that the point of the cutter may be adjusted horizontally to adjust the alignment of said cutter with respect to said follower.

2. The device of claim 1, in which said frame table is provided with an adjustable stop device against which a spectacle frame may be placed to locate the opening of a spectacle frame in one direction with respect to said socket and spindle, and a plurality of clamps so constructed and arranged on said frame table as to securely hold said frame in such position that the said follower can contact the inner edge of the spectacle frame opening when it is in position surrounding said socket and spindle.

3. The device of claim 2, in which said stop device is movable for adjustment parallel to itself and projects laterally at least on one side beyond the side of said table.

4. The device of claim 3, in which said frame table is provided with a straight and narrow slot and said stop device comprises a body portion placed beneath said frame table, said body portion carrying a guide of a size to closely fit said slot and with a threaded bolt of a size to closely fit said slot, said bolt carrying a nut thereon above said frame table whereby parallelism of motion and secureness of adjustment of said stop with respect to said frame table is assured.

5. The device of claim 1, having clamping means mounted on said frame table to secure a spectacle frame to said table, and having an arm mounted in the edge of said frame table in such a position as to be engageable with the temple of a pair of spectacles when mounted on said frame table to hold said temples in a position so as not to interfere with the operation of the machine.

6. The device of claim 1, in which said vertically movable pin, on which said cutter is mounted, is spring pressed upwardly out of cutting position and is provided with a handle whereby said pin may be pressed downwardly to bring said cutter into cutting engagement with a lens blank mounted on said lens blank table, and by which said frame and frame part may be swung about said spindle, and said follower may be pressed against said spectacle frame mounted on said frame table.

7. In combination with the device of claim 1, in which a template for a spectacle lens is provided, said template having an outer edge the shape of a lens to be cut, and means on said template to engage said frame table to hold said template against rotation.

8. In a spectacle lens cutting machine, a frame table to hold a cutter, a guiding means non-rotatably mounted on said frame table, a socket in said frame table within the periphery of said guiding means, a spindle adapted to be non-rotatably mounted in said socket, a lens table mounted on the upper end of said spindle concentric thereto to receive a lens to be cut, a frame swingably mounted on said spindle below said lens table, a clamp member mounted on said frame above and concentric with said lens table, a frame section mounted on said frame by a hinge parallel to said spindle, a follower mounted on said frame section at its lower edge so as to be engageable with said guiding means, and a cutting means located on said frame section over said follower and above the surface of said lens table whereby, by swinging said frame and frame section about said spindle, said cutter will follow the path of said follower.

References Cited in the file of this patent

UNITED STATES PATENTS

| 2,582,117 | Guillermet et al. | Jan. 8, 1952 |

FOREIGN PATENTS

| 639,707 | France | Mar. 17, 1928 |
| 615,422 | Germany | July 4, 1935 |
| 876,320 | Germany | May 11, 1953 |
| 913,688 | Germany | June 18, 1954 |